Feb. 15, 1938.　　　　　G. W. TURMAN　　　　　2,108,759
ANTISTATIC GASOLINE DISPENSING NOZZLE
Filed Jan. 25, 1937

INVENTOR
GARDNER W. TURMAN
BY
ATTORNEY

Patented Feb. 15, 1938

2,108,759

UNITED STATES PATENT OFFICE 2,108,759

ANTISTATIC GASOLINE DISPENSING NOZZLE

Gardner W. Turman, Denver, Colo., assignor to The Gates Rubber Company, Denver, Colo., a corporation of Colorado Application January 25, 1937, Serial No. 122,143

5 Claims. (Cl. 221—84)

This invention relates to improvements in nozzles for dispensing gasoline and other inflammable fluids.

It is well known that gasoline and other hydrocarbon liquids generate static electricity when flowing through a rubber lined hose, and this has been the direct cause of many disastrous explosions and fires originating at filling stations, when gasoline was delivered to the automobile gasoline tanks. After the reasons for such fires had been definitely determined, great care was taken to ground the dispensing nozzle. Owing to the fact that automobiles are supported on rubber tires, which are good electrical insulators, the static electricity, instead of escaping to the ground, as it should, merely charges the automobile chassis and body, which serve as a condenser. The capacity of the automobile body and chassis is large and the potential therefore does not rise sufficiently during the tank filling operation to cause a spark to jump from the wheel rims to the ground as the gap here is excessively great. It happens, however, that the static charge that accumulates during the time the tank is being filled is sufficient to cause a spark when a person standing on the ground moves his fingers towards the conducting portions of the body, and if this spark takes place at or near the fill opening, it sometimes ignites the inflammable and explosive vapors that are given off from the gasoline.

It is evident that as long as static electricity is generated during the filling operation, there is always some danger that the potential will become sufficient to produce a spark between the tank and the fill opening closure, when the latter is being replaced by the operator and when this occurs, an explosion usually ensues.

It has been quite generally accepted that any two dissimilar bodies coming into frictional contact will generate static electricity and the most common example of this is the rubbing of a rod of vulcanized rubber, or sealing wax, with a wool cloth and the rubbing of a glass rod with a piece of silk.

Vulcanized rubber or vulcanite is a very active material for the purpose of generating static electricity, and if gasoline is flowed through a hard rubber tube or nozzle, static electricity is generated in great abundance, and if such material is employed in connection with gasoline dispensing devices, the ignition of the gasoline vapors will be a matter of frequent occurrence. The flexible tubing or hose, through which gasoline is conducted from the pump to the nozzle, is usually lined with a rubber composition to insure that no leakage will take place through the wall of the dispensing hose. Large amounts of static electricity are generated when gasoline flows through such rubber lined tubes.

It is apparent from the above that if the tubes and nozzles employed in the dispensing of gasoline are made of a material that does not generate static electricity when the gasoline flows in contact therewith, the danger of fires from this source will be greatly decreased and, in fact, totally eliminated.

It has been found that certain materials that resemble ordinary rubber and which are generally referred to as "synthetic rubbers" apparently do not generate static electricity when frictionally engaged by flowing gasoline or which, when grounded, do not permit it to accumulate, but permit it to be gradually discharged, and as a consequence of this discovery, it is possible to construct gasoline dispensing hose and nozzles in such a way that the danger of ignition from sparks, due to the accumulation of static electricity, is eliminated.

There is a class of materials, generally designated as "synthetic rubber" and of which "Neoprene" ("Duprene") and "Thiokol" are examples, that do not retain the static electricity generated frictionally by the flowing gasoline, when properly grounded, but permit the same to be slowly and gradually discharged, and extensive tests have shown that such material is admirably adapted for gasoline dispensing nozzles.

When such nozzles are used with any ordinary grounded gasoline dispensing hose or with hose lined with similar material and grounded, the accumulation of static electricity during the dispensing operation is entirely eliminated.

In order to clearly disclose this invention and to indicate one of the uses to which the antistatic materials, broadly indicated above can be put, reference will now be had to the accompanying drawing where a gasoline dispensing nozzle has been illustrated and in which, Fig. 1 is a view, partly in side elevation and partly in section, showing a gasoline dispensing nozzle;

Figure 1:
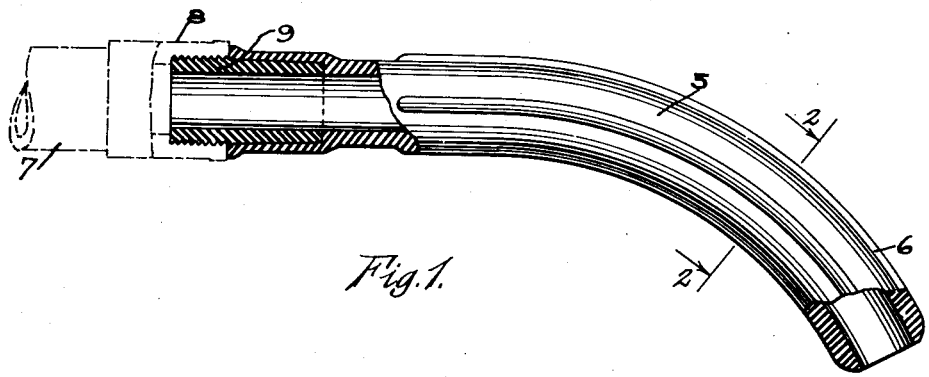

In the drawing, the body of the nozzle which has been designated by numeral 5, is tubular and it moulded from an anti-static material made in accordance with the typical formulae set out hereinafter. The material employed is a thermoplastic and the nozzle is moulded straight after which it is heat softened, bent into the curvature desired and allowed to set. The nozzle has its outer surface provided with a plurality of angularly spaced, longitudinal ribs 6 that engage the inside of the fill opening and assure the escape of air from the tank during the filling operation.

The flexible hose has been indicated by dot and dash lines and designated by reference numeral 7. The hose is provided with a metal coupling member 8 whose inner surface is threaded. The hose may be provided with the usual rubber lining or may have a lining of the same material as that employed in the nozzle.

In Fig. 1, the nozzle has been shown as having a short tubular coupling member 9 which may be of any suitable material such as brass, but is preferably of the same material as the body of the nozzle and so compounded that it is quite hard. The outer surface of this coupling is threaded for engagement of the threaded inside of the connector 8. The coupling member 9 is in reality integral with the nozzle proper as both are assembled in uncured condition and then vulcanized.

Figures 2, 3:
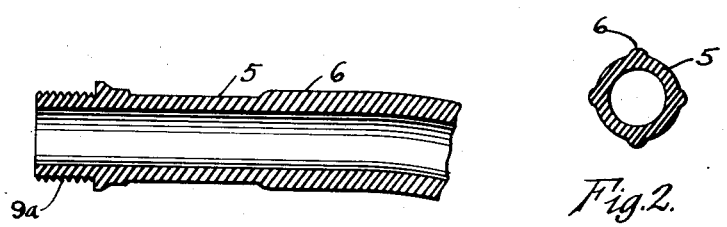
Fig. 2 is a section taken on line 2—2 of Fig. 1.
Fig. 3 is a fragmentary sectional view showing a slightly different construction.
Figure 4:
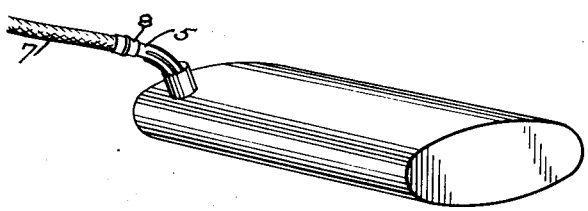
Fig. 4 is a perspective view showing the nozzle in use.

In Fig. 3 a sectional view has been shown in which the coupling member 9a is integral with the body of the nozzle.

In the manufacture, when a "Thiokol" synthetic moulding powder is employed, the body 5 is formed from No. 400 series which produces a soft finished product and the threaded end (9 or 9a) is formed from No. 700 series which gives a hard finished product. These powders may be graded into each other to form an intermediate section harder than the body of the nozzle and softer than the coupling 9a.

The above invention, as indicated, is concerned especially with the material employed for the body of the nozzle; this must be substantially static free under normal operative conditions and preferably flexible. That is, it must possess sufficient resistance to prevent the accumulation of static electricity to a point where a "hot" spark will ultimately be discharged but, at the same time, its resistance must not be too high as to prevent a gradual discharge of the static. Experiments have shown that a nozzle having all of the desirable characteristics and qualifications pointed out above, can be made from a base consisting of any one of certain groups of synthetic rubbers, of which, that known to the trade as "Thiokol", a polymerized olefin polysulfide, is especially satisfactory. The base known as "Duprene", a polymerized 2-bromo-2-butadine-1.3 and the allied compounds containing iodine, fluorine or chlorine instead of bromine is also satisfactory.

Other materials are mixed with the base to give it color, hardness, aging, etc.

A typical formula which has proved satisfactory in actual practice is as follows:

| Formula A | Parts by weight | |
| --- | --- | --- |
| | Pounds | Ounces |
| "Neoprene" (Duprene) Type E | 33 | 0 |
| Extra light calcined magnesia | 2 | 4 |
| "Prenol" (Cotton seed oil and resin) | 3 | 4 |
| "Cumar" P.25 (A coal tar derivative) | 1 | 10 |
| "Duphax" A (A vulcanized drying oil) | 12 | 0 |
| "Thermax" (A soft carbon black) | 59 | 0 |
| "Neozone" D (An anti-oxidant) | 0 | 11 |
| Sulphur | 0 | 5 |
| Zinc oxide (Curing agent) | 3 | 4 |
| Total | 116 | 6 |

When a "Thiokol" base is employed, the typical formula is as follows:

| Formula B | Parts by weight | |
| --- | --- | --- |
| | Pounds | Ounces |
| "Thiokol" DX | 40 | 0 |
| Zinc Oxide (Curing agent) | 4 | 0 |
| "Altax" (A softener) | 0 | 4 |
| Diphenyl-guanidene | 0 | 1 |
| "Gastex" (A soft carbon black) | 26 | 0 |
| Stearic acid | 0 | 4 |
| Total | 70 | 9 |

In Formula A the synthetic rubber base "Neoprene" ("Duprene") such as chloroprene, bromoprene, fluoroprene, etc. is the essential constituent. The soft carbon black acts in its usual capacity as a reinforcing and filling agent and gives strength, firmness and mechanical stability to the composition. The zinc oxide acts as a curing agent. The "Prenol" serves as a stabilizer and the "Neozone D", whose chemical name is phenylbetanaphthalmine, serves as an anti-oxidant. Any equivalents can be substituted for those indicated, instead of zinc oxide other oxides such as litharge may be substituted and instead of carbon black, whiting (blanc fixe) may be used.

In Formula B the "Thiokol" DX is the essential element.

The substances compounded with the synthetic rubber base or bases and the proportions in which they are employed will determine the physical properties of the resultant product, such as hardness and color.

The proportions indicated in the above formulae have been found to give excellent results and need not be materially altered unless some characteristic such as hardness is to be changed. It is, of course, not essential that the nozzle shall be flexible, but it is desirable and when the above formulae are followed, the product has been found to be very satisfactory.

Of the "Neoprenes" ("Duprenes") chloroprene is found to be very satisfactory because it can be polymerized into forms having a very high degree of elasticity and the quick snap back characteristic of natural rubber.

In the drawing, a nozzle has been shown that is moulded and formed entirely of the composition set out in the above formulae, and this is considered to be the preferred way. It is, however, possible to obtain satisfactory results with a nozzle made of other material covered by a layer of the anti-static material.

Since synthetic rubber compounds are so similar in appearance and have other properties so similar to those of natural rubber it would be natural to assume that its electrical properties were also similar. When gasoline is flowed through a tube of natural rubber static electricity is generated in great abundance and cannot escape because rubber is a non-conductor of electricity, and it was therefore unexpected to find that no static electricity is retained under the same conditions when the nozzle is made from material having a synthetic rubber base.

The absence of static when a nozzle made of synthetic rubber was substituted for a natural rubber nozzle at the end of a dispensing hose having the usual ground connection was first believed to be due to a characteristic of synthetic rubber that inhibited the generation of static. It has later been determined that the static free operation is due, most likely, to the fact that synthetic rubber is a conductor, although a rather poor one, and this permits the static to be discharged over the usual ground connection.

The high resistance of the synthetic rubber nozzle prevents the formation of a "hot" spark and the "hottest" spark that can take place is in the form of a corona discharge much too dissipated to provide the heat necessary to ignite the gasoline vapors.

Synthetic rubber nozzles have physical characteristics similar to rubber and can be made so soft as to not scratch the car finish; they are also highly resistant to the action of gasoline and differ from natural rubber in their electrical properties by being conductors to such an extent that any static generated will be dissipated and carried away by the usual ground connection.

Having described the invention what is claimed as new is:

1. A protector for nozzles of gasoline dispensing devices formed of a synthetic rubber-like compound containing as an essential constituent a polymerized olefin polysulfide, said protector possessing a limited degree of electrical conductivity sufficient to gradually dissipate static electricity tending to accumulate thereon.

2. A protector for nozzles of gasoline dispensing devices formed of a synthetic rubber-like compound containing as an essential constituent polymerized 2 bromo-1:3-butadine, said protector possessing a limited degree of electrical conductivity sufficient to gradually dissipate static electricity tending to accumulate thereon.

3. A protector for nozzles of gasoline dispensing devices formed of a synthetic rubber-like compound containing polymerized 2 chloro-1:3-butadine, said protector possessing a limited degree of electrical conductivity sufficient to gradually dissipate static electricity tending to accumulate thereon.

4. A protector for nozzles of gasoline dispensing devices consisting of a tubular elastic body of uniform density containing as an essential constituent polymerized 2 chloro-1:3-butadine, said protector possessing a limited degree of electrical conductivity sufficient to gradually dissipate static electricity tending to accumulate thereon.

5. A protector for nozzles of gasoline dispensing devices formed of a synthetic rubber-like compound comprising one of the following, i. e., polymerized 2 chloro-1:3-butadine, bromo-2-butadine-1, 3, olefin polysulfide, said protector possessing a limited degree of electrical conductivity sufficient to gradually dissipate static electricity tending to accumulate thereon.

GARDNER W. TURMAN.